July 5, 1927.

E. J. HONL 1,634,943

MEANS FOR OPERATING TRACK DRILLS

Filed June 25, 1924

INVENTOR
ERNEST J. HONL
BY
ATTORNEYS

Patented July 5, 1927.

1,634,943

UNITED STATES PATENT OFFICE.

ERNEST J. HONL, OF SLEEPY EYE, MINNESOTA.

MEANS FOR OPERATING TRACK DRILLS.

Application filed June 25, 1924. Serial No. 722,419.

In the operation of drilling holes in railroad rails, it has been customary to provide a car, constructed especially for the purpose, with means thereon for operating a drill. Such cars are comparatively expensive and have no other function than to carry the drilling apparatus and necessarily add to the cost of equipment of a railroad.

The object of my invention, therefore, is to provide a drill-operating means which can be easily and quickly applied to an ordinary car used in section work and driven from the power plant of the car and adapted for operating a drill on either rail of the track without any adjustment or fitting.

A further object is to provide an apparatus which can be used for operating a standard track drill.

Other objects of the invention will appear from the following detailed description.

In the accompanying drawings forming part of this specification,

Figure 1:
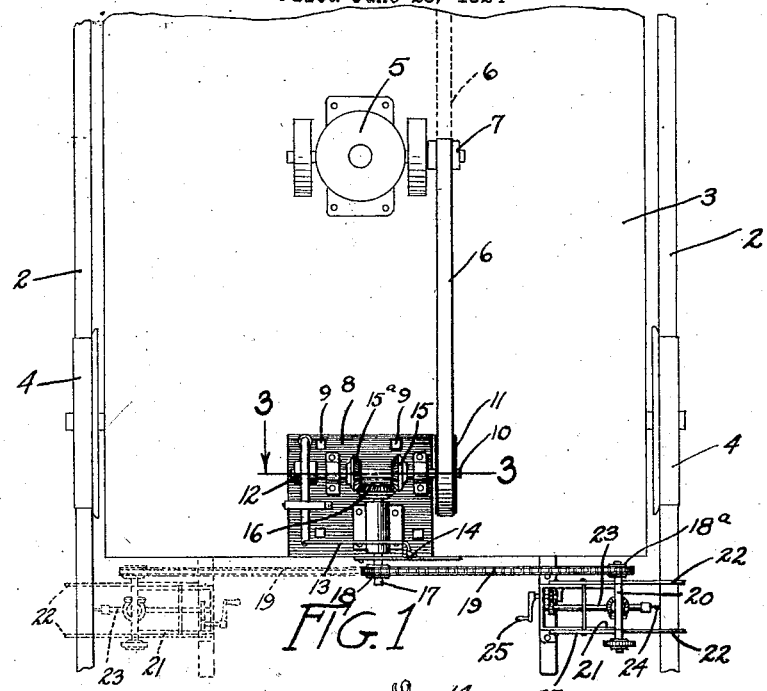
Figure 1 is a plan view of a portion of a railroad section car with my invention applied thereto.

In the drawing, 2 represents the track rails, 3 the platform of a car such as is generally used on the road sections and 4 the supporting wheels therefor, 5 represents the motor by means of which the car is driven through a belt $6^a$ extending from the pulley 7, as indicated by dotted lines, to a suitable driving mechanism not shown.

Figure 2:
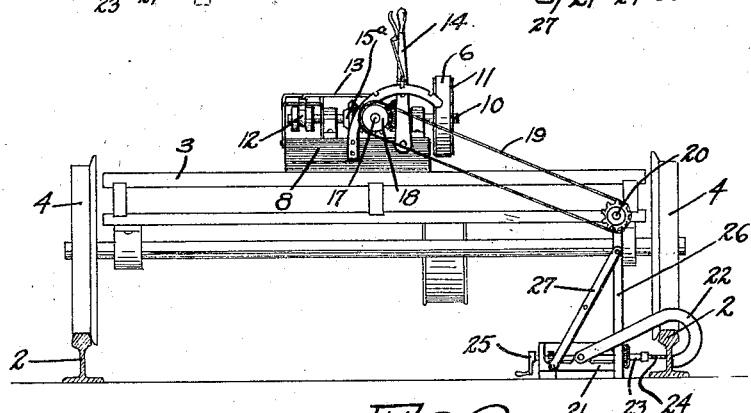
Figure 2 is an end elevation of the car showing the drill in its horizontal working position on one of the rails.
Figure 3:
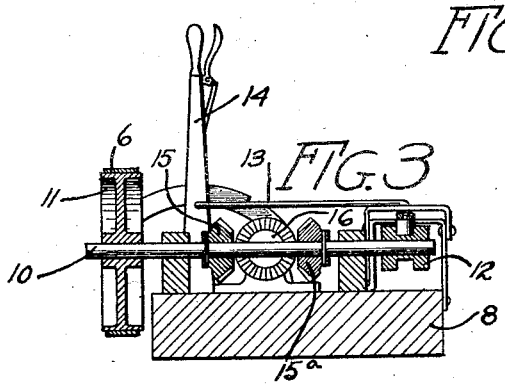
Figure 3 is a sectional view on the line 3—3 of Figure 1.

At one end of the car platform, I provide a base 8 secured to the platform by suitable means such as bolts 9 midway between the longitudinal edges of the platform. This base may be removed whenever desired or transferred to another car and upon it I mount a shaft 10 having a pulley 11 that is adapted to receive the belt 6, which, when it is desired to drill one of the rails, is moved from the dotted line position of Figure 1 to the full line position in the same figure. The shaft 10 at the end opposite from the pulley 11 has a gear shift device 12 thereon and the arm of this shift has a link 13 connecting it with an operating lever 14 by means of which the shaft 10 may be moved longitudinally in its bearings. Pinions 15 and $15^a$ are mounted on the shaft 10 and a similar pinion 16 is secured on the main drive shaft 17 arranged at right angles to the shaft 10 in position to alternately engage the pinions 15 and $15^a$ with the pinion 16 as the gear shift mechanism is operated to move the shaft 10. The base 8 is mounted at the end of the car platform so that the shaft 17 overhangs the platform and its projecting end is provided with a pinion 18 and a sprocket chain 19 which extends from said sprocket wheel to a similar wheel $18^a$ on the shaft 20 of a track drill 21 that is provided with clamps 22 for securing it to the rail to be drilled. On the shaft 20 are two sprocket wheels $18^a$ at opposite ends of the shaft, so that the sprocket chain 19 can be applied to either sprocket wheel as the drill is positioned with relation to one track or the other, it being essential that the chain travels in a plane normal to the shafts 17 and 20. A spindle 23 is mounted in the drill frame and carries a drill 24 which may be operated horizontally to drill the web of the rail as shown in Figures 1 and 2. This track drill is of standard construction equipped with the crank 25 which may be utilized to operate the drill by hand, if necessary or if preferred, and detailed description and illustration of the mechanism of the drill is unnecessary. A suitable frame 26 having braces 27 is mounted on the drill to support the shaft 20 in an elevated position for convenient application of the sprocket belt 19 thereto.

When the drilling is completed in the rail on one side of the track, the clamps 22 are loosened and the drill swung to the other rail on the opposite side of the track as indicated by dotted lines in Figure 1; the central position of the gear shift on the car platform allowing for this movement of the drill from one side to the other without any change or adjustment in the driving mechanism.

In the operation of the device the base of the shift having been bolted to the car platform, the driving belt of the car is shifted to the pulley 11 and the drill having been clamped on the rail, the operator by the manipulation of the lever 14 may feed the drill forward into the work or by shifting the shaft 10 may reverse the operation of the drill to withdraw it from the work.

Thus a very rapid and efficient means for drilling the vertical webs of the rails is provided.

I claim as my invention:

The combination with a main drive shaft having a sprocket wheel on one end, means for mounting the shaft on a railroad car approximately equidistant from the track rails, a drill normally hand operable and having a frame adapted to be positioned on the ground adjacent either rail, said frame including an upward extension, means for clamping the drill frame to an adjacent rail, a supplemental shaft horizontally journaled in the upper part of the upward extension of the drill frame and having sprocket wheels on its opposite ends, and a sprocket chain for connecting the sprocket wheel on the main drive shaft with either of the sprocket wheels on the supplemental shaft.

In witness whereof, I have hereunto set my hand this 21st day of June 1924.

ERNEST J. HONL.